United States Patent
Dinant et al.

(10) Patent No.: US 10,495,279 B2
(45) Date of Patent: Dec. 3, 2019

(54) VEHICLE LIGHTING DEVICE WITH AN OPTICAL ELEMENT PRESSED AGAINST A LIGHT SOURCE SUPPORT

(71) Applicant: VALEO VISION BELGIQUE, Meslin L'Eveque (BE)

(72) Inventors: Franck Dinant, Virginal (BE); Florestan Debert, Nomain (FR); Jean-Francois Delourme, Wattrelos (FR)

(73) Assignee: VALEO VISION BELGIQUE, Meslin L'Eveque (BE)

( * ) Notice: Subject to any disclaimer, the term of this patent is extended or adjusted under 35 U.S.C. 154(b) by 46 days.

(21) Appl. No.: 15/512,875

(22) PCT Filed: Sep. 24, 2015

(86) PCT No.: PCT/EP2015/072017
§ 371 (c)(1),
(2) Date: Mar. 21, 2017

(87) PCT Pub. No.: WO2016/050610
PCT Pub. Date: Apr. 7, 2016

(65) Prior Publication Data
US 2017/0291532 A1 Oct. 12, 2017

(30) Foreign Application Priority Data
Sep. 30, 2014 (FR) .................................... 14 59274

(51) Int. Cl.
*F21S 41/29* (2018.01)
*F21S 41/63* (2018.01)
*F21S 41/143* (2018.01)
*F21S 41/55* (2018.01)
*F21V 17/16* (2006.01)
*B60Q 1/068* (2006.01)
*B60Q 1/20* (2006.01)
(Continued)

(52) U.S. Cl.
CPC ............ *F21S 41/29* (2018.01); *B60Q 1/0683* (2013.01); *B60Q 1/20* (2013.01); *F21S 41/143* (2018.01);
(Continued)

(58) Field of Classification Search
CPC .......... F21S 41/28; F21S 41/295; F21S 41/55; F21S 41/635; F21S 41/143; F21S 41/29;
(Continued)

(56) References Cited

U.S. PATENT DOCUMENTS 4,797,790 A * 1/1989 Brodling ............. F21S 48/1216
362/328
6,382,476 B1 * 5/2002 Randall ............... B65D 47/0885
215/237
(Continued)

FOREIGN PATENT DOCUMENTS

EP  1 547 862 A2  6/2005
EP  1 547 862 A3  6/2005
(Continued)

OTHER PUBLICATIONS

International Search Report dated Dec. 14, 2015 in PCT/EP2015/072017 filed Sep. 24, 2015.
(Continued)

*Primary Examiner* — Sean P Gramling
(74) *Attorney, Agent, or Firm* — Oblon, McClelland, Maier & Neustadt, L.L.P.

(57) ABSTRACT

A motor vehicle lighting device including: a housing and an outer lens; a light source support in the housing; an optical element; a bearing member fixed to the housing, the optical element being gripped between the light source support and the bearing member; and at least one elastic element gripped between the bearing member and the optical element and
(Continued)

configured to be elastically deformable in a direction from the bearing member toward the optical element.

15 Claims, 3 Drawing Sheets

(51) Int. Cl.
*F21S 41/20* (2018.01)
*F21S 45/47* (2018.01)
*F21Y 115/10* (2016.01)

(52) U.S. Cl.
CPC ............ *F21S 41/28* (2018.01); *F21S 41/295* (2018.01); *F21S 41/55* (2018.01); *F21S 41/635* (2018.01); *F21S 45/47* (2018.01); *F21V 17/16* (2013.01); *F21Y 2115/10* (2016.08)

(58) Field of Classification Search
CPC .. F21S 45/47; F21S 41/47; B60Q 1/20; B60Q 1/0683; F21V 17/16–168
See application file for complete search history.

(56) References Cited

U.S. PATENT DOCUMENTS

| | | | |
|---|---|---|---|
| 2004/0042070 | A1 | 3/2004 | Yagi et al. |
| 2006/0232972 | A1* | 10/2006 | Mochizuki .............. B29C 70/82 |
| | | | 362/253 |
| 2015/0184819 | A1* | 7/2015 | Maliar ................ F21S 48/1721 |
| | | | 362/512 |

FOREIGN PATENT DOCUMENTS

| | | |
|---|---|---|
| EP | 2 623 370 A2 | 6/2013 |
| EP | 2 623 370 A3 | 6/2013 |
| FR | 2 887 960 A1 | 1/2007 |
| FR | 2 907 196 A1 | 4/2008 |
| FR | 2 993 632 A1 | 1/2014 |

OTHER PUBLICATIONS

French Search Report dated Jun. 15, 2015 in French Application 1459274 filed Sep. 30, 2014.

\* cited by examiner

VEHICLE LIGHTING DEVICE WITH AN OPTICAL ELEMENT PRESSED AGAINST A LIGHT SOURCE SUPPORT

The present invention concerns a lighting device, notably for motor vehicles. The present invention more particularly concerns a device for lighting the road, notably a fog lamp.

In vehicle lighting devices, it is important that the light beam conform to certain luminous intensity distribution spatial characteristics. For example, some lamps must be able to produce a light beam delimited by a cut-off line at a certain level above the road.

This requires precise location of the light source of these lighting devices relative to the optical element that will deflect its rays so as to form the required light beam.

For example, in different known lamps, the light source is fixed to the housing by a support and the optical element is also fixed to the housing. This is notably the case in fog lamps in which the bulb is fixed via a bulb-support at the rear of the housing and the reflector is fixed to the housing via a cradle.

Such lamps therefore include a plurality of elements in contact between the light source and the optical element cooperating with it. These different contacts represent as many tolerances to be taken into account when designing the lamp. The more there are of them, the more difficult it is to produce these lamps.

The technical problem addressed by the invention is therefore that of simplifying the production of vehicle lighting devices with regard to the tolerances between the light source and the optical element that deflects its rays.

To this end, the invention consists firstly in a motor vehicle lighting device including:
- a housing and an outer lens closing a front opening of the housing and transparent to allow the light rays emitted by said lighting device to pass through it,
- a light source support in the housing to which a light source is fixed or intended to be fixed,
- an optical element adapted to deflect the light rays emitted by the light source,
- a bearing member fixed to the housing, the optical element being fixed relative to the light source by virtue of being at least partly gripped between the light source support and the bearing member, and
- at least one elastic means gripped between the bearing member and said optical means and adapted to be elastically deformable in a direction from the bearing member toward the optical element.

The number of elements between the light source has therefore been reduced, because the optical element is connected to the support of the light source without passing through the housing. The light source and the optical element also form part of the same string of dimensions. Greater flexibility and/or accuracy is therefore obtained in the production of the lighting device.

Moreover, shortcomings in respect of the tolerances of the combination of the light source, the light source support and the bearing member are absorbed by the elastic means, notably tolerances with respect to the housing.

In accordance with one embodiment of the invention, the optical element is directly in contact with the support of the light source. The string of dimensions is therefore reduced. The optical element notably bears directly against the light source support.

In accordance with one embodiment of the invention, the elastic means comprise a direct connection on one side against the bearing member and/or on the other side against the optical means. The direct connection to the optical element makes it possible to press the optical element onto the support of the light source more precisely. The direct connection to the bearing member also strengthens this pressing effect.

Very precise embodiments of the invention can therefore be obtained, having a direct succession of the light source support, the optical element, the elastic means and the bearing member. The bearing member holds the optical element pressed against the light source support.

In accordance with one embodiment of the invention, the bearing member and where applicable the light source support may be fixed directly to the housing. The housing therefore makes it possible to press the various elements together.

The invention may optionally have one or more of the following features:
- the elastic means are in one piece with said bearing member; this improves accuracy;
- the elastic means bear against the optical element;
- the optical element includes a portion for deflecting light rays emitted by the light source and a mobile hinge portion between a first fixed hinge portion and a second fixed hinge portion, the elastic means including the first fixed hinge portion and the light source support including the second fixed hinge portion; the optical element is therefore hinged and mobile between the light source support and the bearing member; this makes it possible to adjust the height of the light beam; the elastic means make it possible to hold the optical element pressed against the support of the light source at the same time as allowing the articulation of the optical element, including in the event of direct contact between on one side the elastic means and on the other side the support of the light source;
- the bearing member includes an armature (mask part) fixed to the housing and carrying the elastic means, the latter including two lugs each connecting the first fixed hinge portion to the armature and holding this first fixed hinge portion at a distance from the armature, the lugs diverging from each other from the first fixed hinge portion to the armature so that the elasticity of the elastic means is conferred by deformation of the lugs by movement of the first fixed hinge portion toward the armature;
- the elastic means have a brace shape the branches of which form the lugs, said first fixed hinge portion being at the top of the brace;
- the edge of the armature facing the portion of the elastic means where the first fixed hinge portion is formed includes an abutment formed by a protuberance extending in the direction of this portion; the deformation of the elastic element is therefore limited, making the lugs more durable;
- the armature includes elastic nesting fixing means nested in the housing, notably a nesting protuberance, and adapted to hold the bearing member pressed against the optical element via the elastic means; the optical element can therefore be fixed to the light source support simply by pressing it on;
- the elastic nesting fixing means, the first fixed hinge portion and where applicable the abutment are aligned in the direction of nesting of the bearing member in the housing; this makes it possible to improve the pressing effect;
- the elastic nesting fixing means comprise a protuberance extending transversely relative to the direction of nesting of the bearing member in the housing and placed at the level of the abutment; this arrangement makes it possible, for molding the bearing member, to produce a common slide in the mold, to enable the formation on the one hand of the gap between the lugs and the armature and on the other this protuberance;

the mobile hinge portion includes two arms on respective opposite sides of the deflection portion of the optical element, these arms being free to rotate in said fixed hinge portions so that the optical element can be oriented by rotation about a rotation axis passing through these two arms; this articulation is easy to produce; the rotation axis may for example be intended to be horizontal when the lighting device is mounted in a vehicle, thereby enabling adjustment of the height of the light beam;

the arms are cylinders or portions of cones and the fixed hinge portions are recesses; in accordance with one embodiment of the invention the concave surfaces of these recesses are cylinder or cone portions of complementary shape to these arms; these shapes are particularly suitable for gripping the optical element whilst leaving it free to rotate;

the optical element is a lens;

the armature is a fixing frame;

the bearing member is a mask placed in front of the light source support in the direction of emission of the light beam by said lighting device; such a mask makes it possible to hide the cables, the back of the housing or other elements of purely functional shape from an observer outside the lighting device;

the armature of the mask is an embellishment visible from the outside of said lighting device with a central opening through which the light rays emitted by the light source pass after or before deflection by the optical element; seen from the front and from the outside, the esthetic portion of the mask can therefore surround the optical element; moreover, the pressing effect is improved if the mask further includes two of said elastic means on respective opposite sides of this central opening, notably on the side of the periphery of the mask; this is therefore a simple way to achieve efficient pressing with a mask, especially for a lighting device in accordance with the invention with a cylindrical housing;

the optical element is a lens having an optical portion deflecting the rays from the light source, the optical portion being housed in said central opening, the elastic means and the mobile hinge portion of the lens being between the embellishment and the light source support;

the outer lens is welded to said housing by a weld produced by vibration welding; this type of welding is particularly advantageous because it is no longer necessary to use an adhesive; it is also particularly suitable for the present invention because the elastic element will be able to absorb the vibrations used during welding and therefore prevent them from being transmitted via the bearing member and the latter from being welded to the optical element, which is all the more of a problem when the latter is mobile;

the light source is a light-emitting diode; the present invention is particularly useful in the context of a lighting device using a light-emitting diode; in fact, because the diode is of very small size compared to the filaments of conventional bulbs, clearances and inaccuracies have a greater impact;

the support of the light source is a heat dissipating device, notably a heatsink, the light-emitting diode being intended to be in thermal contact with the heat dissipating device;

the housing includes a cylindrical portion inside which the light source support, the lens and the bearing member are stacked in this order in a direction parallel to the axis of the cylindrical portion; this therefore simplifies assembly of the lighting device, which is of all the greater benefit when the lighting device is a fog lamp, notably intended to be mounted in the front panel of the vehicle;

the bearing member has its periphery in contact with the edges of the housing; a device is therefore obtained in which the parts fit together as closely as possible; this feature is all the more beneficial in the case of vibration welding of the outer lens to the housing; in fact, in this case the capacities of the elastic means are exploited further, because the vibrations will be transmitted much more easily from the housing to the optical element via the bearing member;

the optical element is arranged to reflect the light rays so as to form a lighting beam having a cut-off line; the precision of the device in accordance with the invention is all the more beneficial in this case, because the cut-off line must be positioned precisely so as not to dazzle the drivers of vehicles approaching in the opposite direction or being followed by a vehicle equipped with a lighting device in accordance with the invention;

the lighting device is a fog lamp.

The invention also consists in a vehicle including a lighting device in accordance with the invention.

Other features and advantages of the invention will become apparent on reading the following detailed description of non-limiting examples, to understand which reference is made to the appended drawings, in which.

Figure 1:
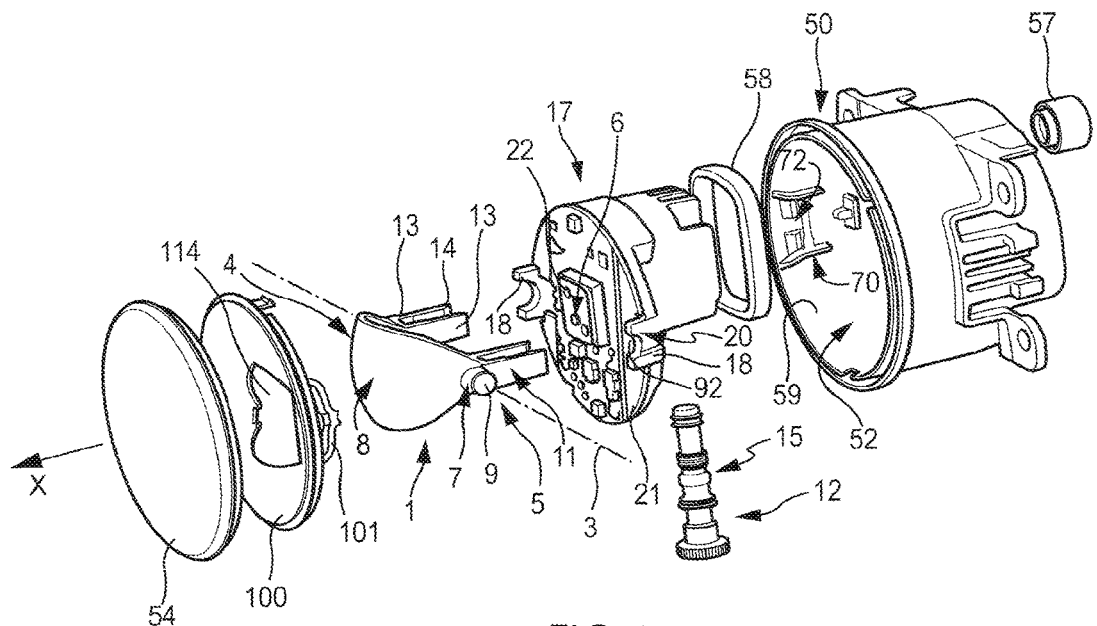
FIG. 1 is an exploded perspective view of a lighting device in accordance with the invention.
Figure 2:
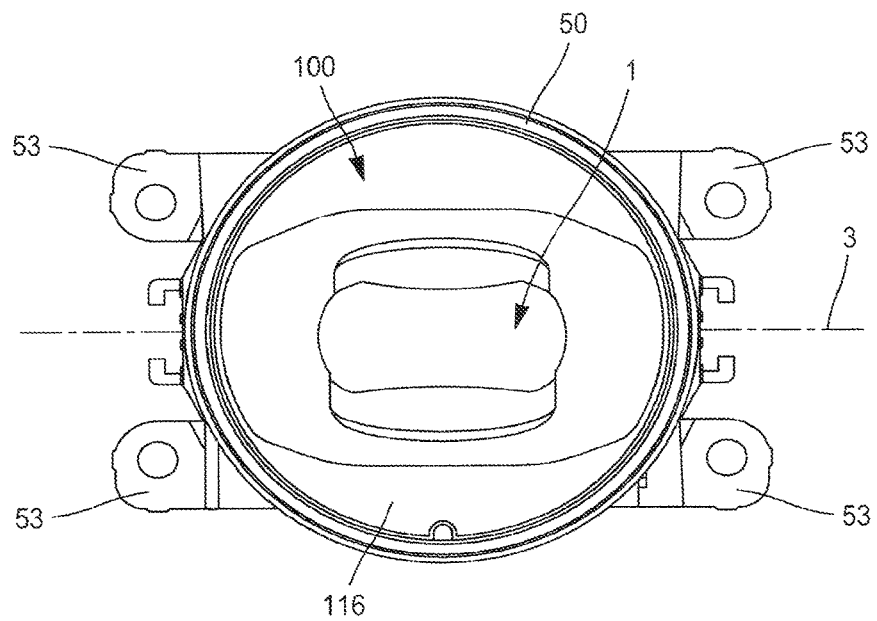
FIG. 2 is a front view of the lighting device from FIG. 1, shown when assembled.
Figure 3:
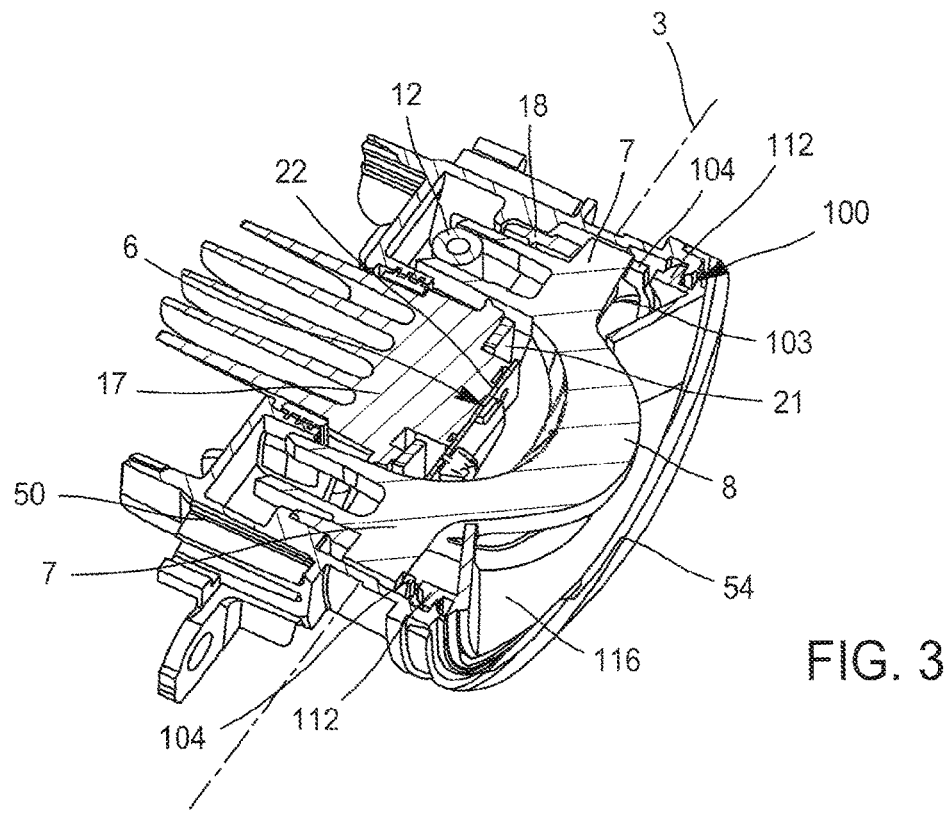
FIG. 3 is a perspective view of the lighting device from FIG. 2 in section on a plane perpendicular to that of FIG. 2 and passing through the axis 3.

As shown in FIGS. 1 to 3, the lighting device includes a housing 50 defining an enclosure 52 inside which are disposed a light source 6 and the optical element 1 deflecting its rays. In the classic manner, said lamp could further include an outer lens 54 and a styling part or mask 100 situated between said outer lens 54 and the optical element 1 in the direction X of emission of the light beam by the lighting device.

The housing 50 takes the form of a substantially cylindrical envelope, for example. The housing may include fixing lugs 53 intended to be fixed to the vehicle.

The lighting device enables the emission of a light beam that is truncated or at least has a very rapid fall-off of the emitted brightness below a certain level corresponding to said cut-off line. For example, the beam is limited below a plane, notably intended to be substantially horizontal and to be located at a certain height above the road.

In the example shown, the device is a lamp generating a fog beam, therefore having a horizontal cut-off line; this lamp is known as a fog light or fog lamp.

This device is configured to allow adjustment of the position of the cut-off line of the beam in a given direction, notably intended to be vertical.

In the example shown, the optical element is a lens 1 including an optical part 4 delimited by a rear refracting surface and a front refracting surface. Note that in the present application the terms "front" and "rear" are to be understood relative to the direction of emission of light rays by the lighting device. The front and rear refracting surfaces are arranged so as to produce the cut-off line. In accordance with an embodiment that is not shown, there may also be refracting surfaces carrying striations arranged to deflect the light rays so as to form the cut-off line.

The position of the cut-off line is adjusted by varying the angular position of the lens 1 about a rotation axis 3 intended to be oriented according to the transverse axis of the vehicle equipped with said lighting device. In this example, to allow this adjustment, the lens 1 also includes a mobile hinge portion 5 including arms 7 rotatable about the rotation axis 3.

This yields a solution whereby the cut-off line is adjusted by actuating a single member, namely the lens 1, serving to transmit the beam.

Said optical part 4 and said mobile hinge portion are advantageously made of the same material. Said articulation portion 5 and said optical part 4 are advantageously in one piece.

In accordance with this example, the light source may be a light-emitting diode (LED) placed on the upstream side of the lens 1 in the direction of emission of the light beam by the lighting device.

The support 17 of this light source 6 is fixed directly to the housing 50 of the lighting device. It therefore locates and fixes the source in the housing 50.

Here the cut-off line is produced by a mutual arrangement of the lens 1, notably its front and rear refracting surfaces, and the light source 6, as is known in itself, notably from the documents EP1762776, in particular the embodiments corresponding to FIG. 11 and the subsequent figures, and/or EP1970619, in particular the FIG. 1 embodiment.

The rotation axis 3 advantageously passes substantially through the light source 6. The lens 1 could further have a focus at the level of the light source 6. This produces a beam the characteristics of which do not vary as a function of the angular position of the lens 1 and are therefore not dependent on the position of the cut-off line.

For example, said optical part 4 extends from arms of said hinge portion 5 diverging radially from the rotation axis 3. In other words, said lens 1 has flanks extending in the direction of said rotation axis 3 from a front area 8 of said lens 1, said front area 8 being the portion of said lens 1 that is farthest from the rotation axis 3. Said optical part 4 of the lens 1 in particular lies on either side of said front area 8.

The arms 7 are situated on respective opposite sides of said optical part 4, in the direction of the rotation axis 3. For example, they include journals 9 for articulating the lens 1 about the rotation axis 3. The journals 9 have a cylindrical shape and are oriented along the rotation axis 3. The lighting device is configured to allow rotation of the journals 9 on themselves about the rotation axis 3 and consequently rotation of the whole of the lens 1 about the same axis.

Here said mobile hinge portion 5 further includes means for driving rotation of the lens 1. For example, said drive means include at least one fork 11 carrying ribs intended to cooperate with an adjuster screw 12 oriented transversely, notably orthogonally, to the rotation axis 3 and/or to said ribs.

Here the forks 11 are part of said journals 9. They include lateral flanks 13 oriented radially relative to the rotation axis. Said lateral flanks 13 of the forks 11 include ribs 14 facing one another from one of said lateral flanks 13 to the other. The ribs 14 thus define a counterpart to a thread 15 situated at the level of the adjuster screw 12.

The drive means may be positioned on either side of said optical part 4 of the lens 1 along the rotation axis 3. This makes it possible to choose to place the adjuster screw 12 on the right or on the left when assembling the device.

Here the light source support 17 includes support arms 18, of which there are two in this example, on respective opposite sides of the global emission axis of the LED. Said support arms 18 are intended to cooperate with said mobile hinge portion 5 of the lens 1, in particular the journals 9, so as to impart to said lens 1 a degree of freedom in rotation about the rotation axis 3 when acted on by the adjuster screw 12. The arms 18 of the support are part of the support 17 of the light source 6 and extend in a direction perpendicular to the rotation axis 3. These arms 18 of the support have at the distal end a fixed articulation portion 20 adapted to receive said journals 9 and to allow them to rotate freely about the rotation axis 3. In this example, this is a recess 20 the surface of which is a portion of a cylinder complementary to the shape of the journals 9.

Figure 5:
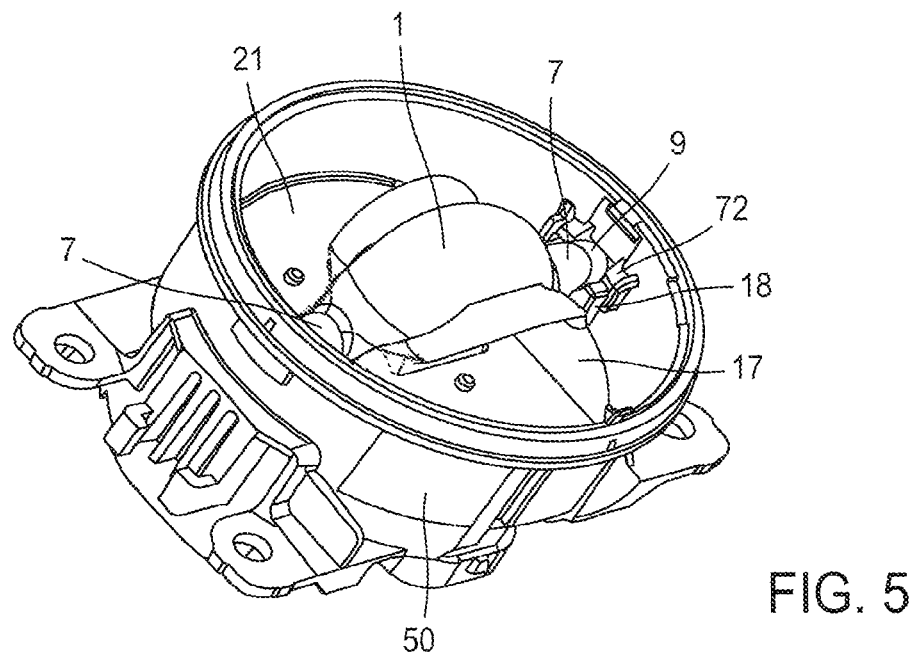
FIG. 5 is a perspective view of the lighting device from FIG. 2 without the outer lens or the bearing member.

The lighting device is represented in FIG. 5 without the mask to show the lens 1 with its journals 9 housed in the recesses 20 of the support 17 of the light source 6.

Figure 6:
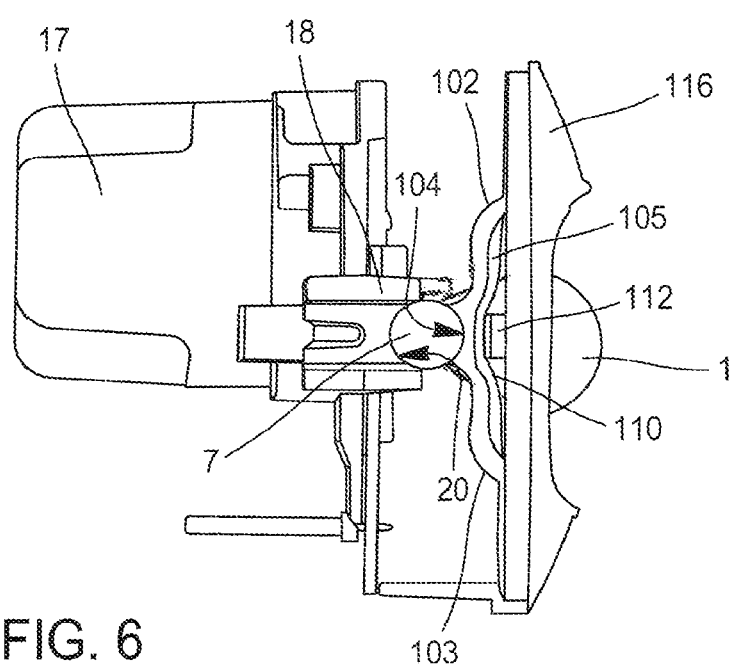
FIG. 6 is a side view of the lighting device from FIG. 2 without the housing or the outer lens.

The mask 100 forms a bearing member. As shown in FIG. 1, this bearing member is stacked in the housing of the lighting device and fixed into it. Being stacked in this way, it presses the journals 9 into the recesses 20 of the support 17. FIG. 6 shows the lighting device without the housing so that this pressing effect can be seen.

Figure 4:
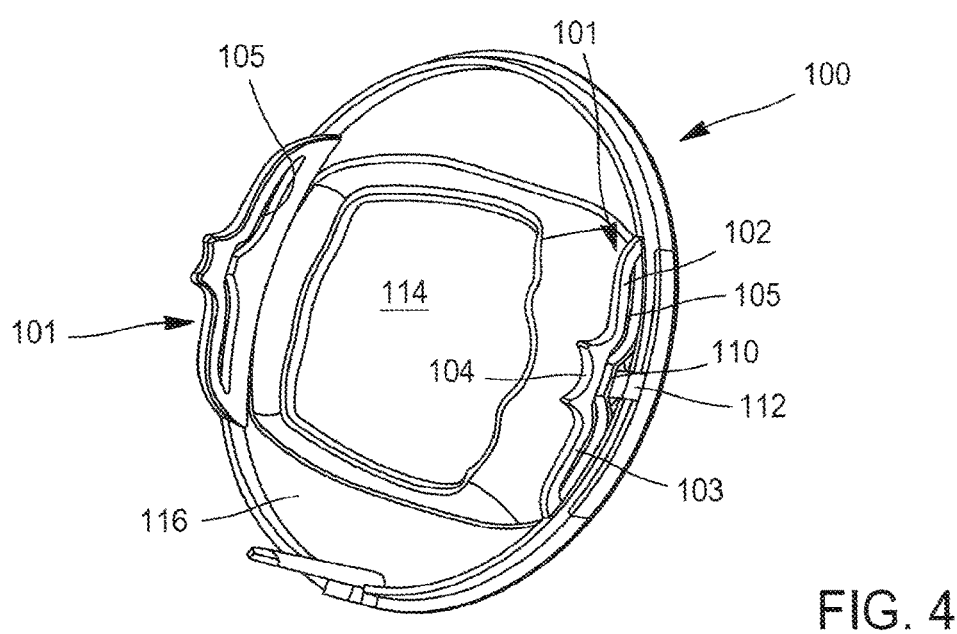
FIG. 4 is a perspective view of the bearing member of the lighting device from the preceding figures.

This mask 100, shown in detail in FIG. 4, includes two elastic means (springs) 101 and an armature 116. The latter forms the embellishment of the mask. These elastic means 101 are on respective opposite sides of the mask 100 and extend toward and as far as the journals 9.

Each elastic means 101 has the shape of a brace the branches of which form two lugs 102 and 103, the apex of the brace forming a recess 104. The lugs 102 and 103 are connected at their ends on one side to this recess 104 and on the other to the embellishment 116. Apart from the ends connecting the lugs to the embellishment, the lugs 102 and 103 are at a distance from the embellishment 116. There is therefore a gap 105 between a portion of the lugs and the recess 104 carried by these lugs. The recess 104 can therefore move toward the embellishment by deformation of the lugs, imparting elasticity to the elastic means 101. The brace shape simplifies the production of these deformable means.

These recesses 104 of the mask 101 have the shape of a portion of a cylinder complementary to the shape of the journals. They therefore also form a fixed hinge portion pressed against the journals 9.

The mask therefore presses the journals 9 and therefore the lens 1 against the support 17 of the light source via the elastic element 101. The lens 1 is therefore fixed directly to the support 17 of the light source.

The mobility of the lens 1 is therefore conferred by two articulations, each formed by the recesses 104 and 20, forming a first fixed hinge portion 104 and a second fixed hinge portion 20, respectively part of the corresponding elastic element 101 and the corresponding arm 18 of the support 17 of the light source, together with the journals 9, forming the hinge portion 5 mobile relative to the fixed hinge portions.

In this gap 105 the edges of the armature forming the embellishment include an abutment 104 formed by a protuberance extending in the direction of the recess 104 and formed in a central portion of the elastic element 101. This makes it possible to limit the travel of the central portion of the elastic means 101 and therefore of the corresponding fixed hinge portion 104 in the direction of the edges of the armature 116.

This armature is adapted to be nested in the housing 50 so as to fix it directly therein. A plurality of protuberances 112 on the periphery of the armature 116 extend transversely relative to the direction of nesting of the mask 101 in the housing 50. There are two of these in this example. Each protuberance is a tooth 112 received in an orifice 51 of the housing 50. The teeth 112 therefore form elastic nesting means for fixing the mask into the housing 50.

When molding the mask 100, two counter-forms may be used that are removed from the mold in a direction approximately corresponding to the future direction X of emission of the beam to form the embellishment 116. These counter-forms include recesses, or imprints, for producing the faces of the embellishment 116, where applicable a central opening 114 of the embellishment, and part of the elastic means. To produce the recesses 105, and therefore to produce the complete elastic means, it will be necessary to use two slides removed from the mold in a different direction, notably perpendicular to the direction in which the counter-forms move away from each other.

In accordance with one embodiment of the invention, these teeth 112 extend transversely relative to the direction of nesting of the bearing member 100 in the housing 50 and are placed at the level of the abutment 110. This makes it possible to be sure that the mask 100 is nested as close as possible to the arms 7 of the lens. Moreover, in the case of molding as described in the preceding paragraph, the same slides may be used to mold the teeth 112 as produce the recesses 105. The slide will include a pin for each gap 105 and an imprint for the corresponding tooth 112.

Here the light source support 17 further includes a control electronic card 21. This card 21 is notably used to control said light source 6. The arms 18 of the light source support 17 lie on respective opposite sides of said control card 21 along the rotation axis 3.

Said control card 21 is advantageously offset radially relative to the light source 6 along the rotation axis, i.e. here longitudinally along the global emission axis 3 of the light source. In other words, said light source 6 is raised relative to the control card 21. This facilitates passing the rotation axis 3 through the light source 6.

To be more precise, here said light source 6 is situated at the level of a dedicated electronic card 22 of said device and said dedicated electronic card 22 is raised relative to said control card 21 in the direction of the rotation axis 3. For example, said dedicated card 22 consists of a substrate such as an SMI board while said control card 21 consists of a substrate such as an FR4 board, for example. Said dedicated electronic card 22 is carried by said control card 21.

In this example the light source support 17 is a heat dissipating device. This heat dissipating device is more particularly in thermal exchange relationship with the LED, notably via said dedicated electronic card 22.

Said housing 50 has an internal face 59 provided with ribs 70 for guiding said articulation arms 18 of the light source support 17. Said guide ribs 70 contribute to fixing said light source support 17 in said housing 50 by way of said articulation arms 18 of the light source support 17.

Said internal face 59 of the housing 50 could further include clipping ribs 72, i.e. elastic nesting ribs, for fixing the light source support 17 by means complementary to these ribs. The latter means may comprise the edges of the arms 18 of the light source support 17, as can be seen in FIG. 5.

As shown in FIG. 1, the lighting device in accordance with the invention could be mounted in said housing 50 from the front. Said housing 50 is then closed at its end opposite that of the outer lens 54 by a back wall that cannot be seen in this figure. Said guide ribs 70 and/or said clipping ribs 72 are then open toward the front.

The lighting device in accordance with the invention can therefore be assembled by stacking in and toward the back of the housing 50 the light source support 17, the lens 1 and the mask 100. The components are fixed simply by nesting the light source support 17 and the mask 100 in the internal wall of the housing 50.

As the lens 1 is gripped directly by the support 17 of the light source 6 and the mask 100, both fixed to the housing 50, there is little tolerance clearance to be taken into consideration between the light source and the lens.

The outer lens 54 then closes the housing 50 and is sealed to it, for example by vibration welding. In this case, the elastic means 101, by virtue of their arrangement, will absorb vibrations liable to be transmitted from the mask 100 to the lens 1 when carrying out the vibration welding; this avoids the risk of the journals 9 being welded to the recess 104 carried by the elastic means 101.

The mask 100 includes a central opening 114. Once the fog lamp has been assembled, the mask surrounds the lens 1, its portion deflecting the light rays being accommodated in the central opening. Seen from the outside, and from the front, practically only this optical part of the lens 1 and the front face of the embellishment 116 of the mask 100 can be seen.

To favor the dissipation of heat and the compactness of the lamp, the back wall of the housing 50 may include an opening through which the fins of the heat dissipating device 17 pass. In this case the lamp includes an annular seal 58 in order to provide a seal between the heatsink 17 and said housing 50. It could also include a ventilation device 57 enabling the housing 52 to communicate with the outside.

In accordance with an embodiment that is not shown, said emission device may be mounted from the rear and said housing is closed at its longitudinal end opposite the outer lens by said light source support.

In accordance with one possible embodiment, said light source support 17 may have holes 92 passing through it. The holes 92 through it are arranged to allow passage of the forks 11 of the hinge portion and are sufficiently wide to allow the relative movement of the fork 11. This facilitates longitudinal mounting of the lens 1 on the housing and across the support 17.

It is possible to produce the hole 92 passing through the light source support 17 between the articulation arms 18 of the light source support 17.

The present invention is particularly advantageous in the context of a fog lamp. However, it could be applied to other lighting devices.

For example, to lighting devices with a lens rotating about a vertical axis to produce a mobile portion of a light beam, notably a first beam with an oblique or vertical cut-off line, this first beam being intended to be combined with a beam having a horizontal cut-off line.

In accordance with one embodiment of the invention, this combination may be applied to a lighting device in accordance with the invention generating an elementary light beam with an oblique or vertical cut-off intended to be combined with a second elementary light beam with the cut-off line horizontal. The oblique cut-off beam moving horizontally by actuation of the optical element, for example as a function of turns executed by the vehicle equipped with the lighting device or as a function of vehicles approaching in the opposite direction.

The invention claimed is:

1. A motor vehicle lighting device comprising:
a housing and an outer lens closing a front opening of the housing, the outer lens being transparent to allow light rays emitted by the lighting device to pass through the outer lens;
a light source support in the housing;
a light source is fixed to the light source support so as to emit light in a light emitting direction;
a lens provided in the path of light emitted from the light source in the light emitting direction and configured to deflect the light rays emitted by the light source;
a mask mounted to the housing in the path of light emitted from the light source in the light emitting direction, the mask covering a portion of the lens as viewed in the light emitting direction, the mask having an opening to permit passage of the light emitted from the light source in the light emitting direction; and
at least one spring provided to the mask, the spring being elastically deformable in the light emitting direction toward the lens, such that the lens is elastically pressed toward the light source support in the light emitting direction by the spring upon mounting the mask to the housing.

2. The lighting device according to claim 1, wherein the spring provides a direct connection between the mask and the lens.

3. The lighting device according to claim 2, wherein the spring is in one piece with the mask.

4. The lighting device according to claim 1, wherein the lens includes a lens portion for deflecting light rays emitted by the light source and a mobile hinge portion between a first fixed hinge portion and a second fixed hinge portion, the spring including the first fixed hinge portion and the light source support including the second fixed hinge portion.

5. The lighting device according to claim 4, wherein the mask comprises a mask part fixed to the housing and the spring, wherein the spring comprises two lugs, each connecting the first fixed hinge portion to the mask part and holding the first fixed hinge portion at a distance from the mask part, the lugs diverging from each other from the first fixed hinge portion to the mask part so that elasticity of the spring is conferred by deformation of the lugs by movement of the first fixed hinge portion toward the mask part.

6. The lighting device according to claim 5, wherein the spring has a brace shape including branches that form the lugs, the first fixed hinge portion being at a top of the brace.

7. The lighting device according to claim 5, wherein an edge of the mask part facing the portion of the spring where the first fixed hinge portion is formed includes an abutment formed by a protuberance extending in a direction of the portion.

8. The lighting device according to claim 7, wherein the mask part includes elastic nesting fixing means nested in the housing and configured to hold the mask pressed against the lens via the spring.

9. The lighting device according to claim 8, wherein the elastic nesting fixing means comprises a protuberance extending transversely relative to a direction of nesting of the mask in the housing and placed at a level of the abutment.

10. The lighting device according to claim 4, wherein the mobile hinge portion includes two arms on respective opposite sides of the deflection portion of the lens, the arms being free to rotate in the fixed hinge portions so that the lens is oriented by rotation about a rotation axis passing through the two arms.

11. The lighting device according to claim 1, wherein the mask part comprises an embellishment visible from outside of the lighting device.

12. The lighting device according to claim 1, wherein the lens bears directly against the light source support.

13. The lighting device according to claim 1, wherein the outer lens is welded to the housing by a weld produced by vibration welding.

14. The lighting device according to claim 1, wherein the housing includes a cylindrical portion inside which the light source support, the lens and the mask are stacked in this order in a direction parallel to the axis of the cylindrical portion.

15. The lighting device according to claim 1, the lighting device being a fog lamp, wherein the lens is configured to reflect the light rays to form a lighting beam having a horizontal cut-off line.

* * * * *